United States Patent [19]
Inagami et al.

[11] 3,764,710
[45] Oct. 2, 1973

[54] DRINK COMPOSED OF FERMENTED OR ACIDIFIED MILK AND CITRUS FRUIT JUICE

[75] Inventors: Kaoru Inagami, Tokyo; Isamu Mitsui, Yokohama; Hiroaki Kando, Tokyo, all of Japan

[73] Assignee: Calpis Shokuhin Kogyo Kabushiki Kaisha, Tokyo, Japan

[22] Filed: Aug. 17, 1971

[21] Appl. No.: 172,561

[30] Foreign Application Priority Data
Sept. 12, 1970 Japan.............................. 45/79692

[52] U.S. Cl................ 426/185, 426/190, 426/206, 426/356, 426/379
[51] Int. Cl............................ A23c 9/12, A23l 1/02
[58] Field of Search ................ 99/28, 54, 105, 205, 99/59

[56] References Cited
UNITED STATES PATENTS

| 3,625,702 | 12/1971 | Exler | 99/54 |
| 2,890,961 | 6/1959 | Davis | 99/205 |
| 2,724,652 | 11/1955 | Brent et al. | 99/205 |
| 2,419,909 | 4/1947 | Noyes | 99/205 |
| 1,610,962 | 12/1926 | Mittendorf | 99/59 |
| 2,824,804 | 2/1958 | Mishima | 99/59 |
| 3,563,760 | 2/1971 | Kuwabara | 99/59 |
| 1,925,441 | 9/1933 | Finley et al. | 99/54 |
| 2,818,342 | 12/1957 | Ransom | 99/105 |

FOREIGN PATENTS OR APPLICATIONS

| 695,603 | 8/1953 | Great Britain | 99/59 |

OTHER PUBLICATIONS

Cruess, Commercial Fruit & Vegetable Products, 1948, 3rd Ed., Pages 337–340, 364, 365.

Primary Examiner—Morris O. Wolk
Assistant Examiner—Stephen B. Davis
Attorney—Stevens, Davis, Miller & Mosher

[57] ABSTRACT 100 parts by weight of citrus fruit juices containing from 10–25 percent by volume of pulp material are concentrated to not less than one-third of their original weight. The concentrated juice is mixed with from 5 to 40 parts by weight, based on the weight of the original juice, of fermented or acidified milk. The resulting drink can be homogenized and can include other ingredients such as sugar, acids, flavoring and coloring agents.

11 Claims, No Drawings

DRINK COMPOSED OF FERMENTED OR ACIDIFIED MILK AND CITRUS FRUIT JUICE

BACKGROUND OF THE INVENTION

It is customary that the citrus fruit juices used for the production of drinks containing fermented milk or milk with added organic acid and citrus fruit juices are concentrated in advance to a weight of from one fourth to one sixth of the original weight for the purpose of improving their stability during storage of facilitating their handling.

Such concentrated fruit juices, however, upon being mixed with fermented milk or milk with added organic acid cause the coagulation and rapid precipitation of colliodal particles suspended in the fermented milk.

To prevent such coagulation, there have been hitherto proposed methods such as 1. a method of adding a stabilizer, for example a paste material to the mixture,
2. a method of decomposing the pectin materials in the fruit juice by enzymes,
3. a method of demineralizing the calcium contained in the fermented milk. In all of these methods, however, consideration has been given only to the prevention of the precipitation and separation, and not to the preservation of the natural flavor inherent in the fruit juice.

According to our studies, it has been made clear that the poor flavor drinks of this sort usually results from unsuitable procedures of squeezing and concentrating fruit juices. In other words, when citrus fruit juices are concentracted to from one fourth to one sixth of their original weight, not only the large part of the pulp materials, but also the pectin materials are removed since they are gelled by concentration.

According to our studies, what gives a food flavor to the citrus juices is the body of the good quality pulp materials derived from the vesicle (juice cell) membrane. (This is apparent from the fact that home-made juices produced with a mixer have a better flavor than the usual commercially produced fruit juices, even though the former is mixed with a considerable amount of water.) Thus, it is natural that concentrated fruit juices have little flavor of the original fruit juices, since the large part of the pulp materials has already been lost.

Further, in the case of mixed drink of fruit juices and fermented milk, decomposing or removing the pectin materials by enzymes treatment or other treatments was effective for the purpose of preventing coagulation, but not for retaining its flavor.

In order to solve such problems and to produce drinks containing nearly the same amount of the pulp and pectin materials as the original juices, the pulp materials which have been separated beforehand by pulpers or finishers or the like can be returned to concentrated fruit juices. Even with this method, however, the flavor is greatly deteriorated because of high concentration. Moreover, not only does the use of the concentrated juices exert an inhibitory action on the dispersing property of the pulp materials, but also the method necessitates a very complicated treatment upon re-mixing.

SUMMARY OF THE INVENTION

It is an object of the present invention to provide a method of producing drinks containing citrus fruit juice and fermented milk or milk with added organic acid in which the coagulation and separation liable to occur upon mixing is prevented. This is achieved by concentrating 100 parts by weight of the original citrus fruit juice containing from 10 to 25 percent by volume of the pulp materials composed mainly of vesicle membrane to not less than one third of their original weight, and mixing the resulting concentrate with from 5 to 40 parts by weight of fermented milk or milk with organic acids added.

The drink thus obtained shows an excellent flavor in comparison with others on a 1 percent level of significance by sensory evaluations.

DETAILED DESCRIPTION OF THE INVENTION

We have established a method of producing a drink with a rich flavor in spite of containing fermented milk or milk with added organic acid and citrus fruit juices, the juices having been concentrated by entirely different methods from that of the conventional methods of producing concentrated citrus fruit juices. Care is taken concerning the denaturation of the pectin materials which exert a large influence on the coagulation and separation of the product, and after concentrated juices and fermented milk are mixed, the mixture continues to be stable for a long time without the addition of any special stabilizer.

The production of the concentrated citrus fruit juices used in this invention and the addition of fermented milk will now be described more fully:

1. Citrus fruits, after being peeled, are squeezed by the chopper-pulper method or the in-line extractor method, and the content of the pulp materials of the squeezed juices is adjusted to from 10 to 25 percent by volume of the pulp materials composed mainly of vesicle membrane of good quality. Then the juice is brought to the preparation step for concentration, without removing the pulp materials by a finisher or the like. The citrus fruits mentioned above are Citrus Unshiu orange, Tangerine orange, Mandarine orange, Valencia orange, Navel orange, Summer orange, Grapefruits, Citron and Lemon.

2. In the preparation step, the following procedures are carried out: the deaeration treatment for preventing the loss of flavor and the decomposition of vitamin C, the heat treatment for inactivating pectinase, and the homogenizing treatment for finely crushing the pulp materials.

3. In the subsequent concentration step in which the vacuum concentration or the freeze-concentration is applied, the concentration ratio must not fall below one third by weight. Thus, concentrated citrus fruit juices with a rich flavor deriving from good quality pulp materials are obtained.

4. To the concentrated citrus juices obtained in Step(3), the fermented milk or other milk with organic acids is added in an amount of from 5 to 40 percent by weight calculated on the basis of the original fruit juice weight, and sucrose, organic acids such as lactic acid, citric acid, malic acid and fumaric acid, food colorings, food flavorings, antioxidants, antiseptics, condiments, reinforcing additives (for example vitamin C), carbon dioxide, purified water and so forth are added as required. Thus, a citrus fruit juice drink which contains fermented milk is obtained. Then a high pressure homogenizing treatment (for example, $150 kg/cm^2$) may be sometimes applied to the above process.

Also, by the same procedure, drinks having a good flavor and which remain stable during storage are obtained using organic acids-added milk instead of fermented milk. The fermented milk or organic acids-added milk are made from skim milk and/or reconstituted skim milk. Lactic acid, citric acid, malic acid and fumaric acid are used as the added organic acids.

The following experiments show the relationship betwen the amount of the pulp materials contained in the final product and its flavor as well as its coagulation property.

EXPERIMENT 1

Unshiu orange (Satuma orange) juice, concentrated to 1/2.5 by weight and containing the good quality pulp materials, and other fruit juices were used as the raw materials for preparing fermented milk-containing fruit juice drinks. The sensory tests and measurements of coagulation were performed on each sample. The results obtained are shown in Table 1.

TABLE 1

| No. Sample | Pulp materials content (%) | Pectin materials content (%) | Sensory value (ranking average) | Coagulation 1 month | 3 months |
|---|---|---|---|---|---|
| 1. Unshiu orange juice conc. to 1/5 by weight | 0.38 | 0.060 | 3.15 | +++ | +++ |
| 2. Unshiu orange transparent juice conc. to 1/5 by weight | 0 | 0.010 | 3.68 | – | ± |
| 3. Unshiu orange juice conc. to 1/5 by weight (with the pulp materials added) | 14.8 | 0.138 | 3.05 | +++ | +++ |
| 4. Unshiu orange juice conc. to 1/2.5 by weight | 14.8 | 0.221 | 2.00 | – | – |
| 5. Unshiu orange juice conc. to 1/2.5 by weight (free from the pulp materials) (Note) | 0.38 | 0.073 | 3.13 | – | + |

Sensory value: The sample No. 4, the product based on this invention is superior to others on a 1% level of significance.
Coagulation:
– No coagulation
+++ Extreme coagulation The amount of the pulp materials of each sample used in this experiment was volumetrically measured by the centrifugal separation method, and the amount of the pectin materials measured by Okimasu's colloidal titration method. In each sample, the concentrated fruit juice was used so as to be 100 parts by weight calculated on the basis of the original fruit juice, and 10 parts by weight fermented milk, 37 parts by weight sucrose, 0.4 part by weight food flavorings, and a small amount of citric acid and sufficient purified water to amount to 100 parts by weight in total are added. The acid content was adjusted with citric acid so as to be 1.20 percent by weight, and thereby the ratio of sugar to acid in each sample was kept same.

In the sensory test, all of five samples, after diluted five times, were simultaneously presented to the panel of 20 persons. The order or presenting samples was determined by the modified Latin square method and the evaluation was made by the ranking method. As the result of examining the ranking average by Kramer's method, the sample which contains the Unshiu orange juice concentrated to 1/2.5 by the method of this invention was found to have a superior flavor to others on a 1 percent level of significance.

The degree of coagulation was determined by observing the samples after storage at room temperature for three months. It was found out that there were no other samples which have a stability comparable to that of the Unshiu orange juice concentrated to 1/2.5 by weight (the control) by the method of this invention.

From the above-mentioned results, the only sample that has a good flavor and remained stable without coagulation for a long time was the sample which contained the Unshiu orange juice concentrated to 1/2.5 by weight by the method of this invention, and no other samples gained a good valuation both in the sensory value and coagulation.

The good flavor of the sample based on this invention can be attributed to the sufficient pulp and pectin materials which are the important elements of the flavor of citrus fruit juices, and also the low concentration ratio helps to prevent the pectin materials from denaturating and deteriorating.

The degree of esterification of the soluble pectin materials of the citrus fruit juices which were concentrated to not less than one third of the original weight by the method of this invention is in the same range of from 45 to 60 percent as that of the original fruit juice. However, a higher concentration than one third concentration, accelerates the coagulation, since the relatively increased acid content lowers the degree of esterification and then the pectin materials are decomposed to smaller molecules.

Furthermore, low concentrated fruit juices, which have a lower content of salts in comparison with highly concentrated juices, seldom become gelled, even in the presence of calcium or magnesium ions, or other divalent, or more than divalent metalic ions. And, even when the salts content is increased by adding fermented milk or other similar type of milk, the low concentrated fruit juices can be prevented from gelling and coagulating, because the high degree of esterfication prevents the soluble pectin materials from becoming the unsoluble pectin materials. Besides, since the juices are free from the pulp materials deriving from segment (loculus) membrance which has been removed by pulpers and/or finishers, no separation and denaturation are caused during storage.

The following experiment shows our studies of how much fermented milk can be successfully mixed, without addition of any suspending agent, for example a paste agent, with citrus fruit juice concentrated to not less than one third by weight.

EXPERIMENT 2

In this experiment, each concentrated fruit juice was used in an amount of 50 parts by weight calculated on the basis of the original fruit juice and mixed with certain amount of fermented milk, and the mixture was added with a distilled water so as to amount to 100 parts by weight in total. Each mixture was put in a test tube respectively, and was left to stand for 2 hours for observing the coagulation and precipitation.

TABLE 2

| Amount of fermented milk calculated on the basis of the original fruit juice (%) | Fruit juice concentrated to 1/2.5 by weight | Fruit juice concentrated to 1/5 by weight | Fruit juice concentrated to 1/5 by weight with the pectin materials added | Fruit juice concentrated to 1/5 by weight with the pectin and pulp materials added |
|---|---|---|---|---|
| 0 | (0.11) (7.4) | (0.03) (0.19) | (0.11) (0.19) | (0.11) (7.4) |
|  | − | − | − | − |
| 10.0 | − | ++ | − | +++ |
| 20.0 | − | ++ | ± | ± |
| 30.0 | − | +++ | ++ | ++ |
| 40.0 | − | +++ | ++ | +++ |
| 50.0 | ++ | +++ | +++ | +++ |
| 60.0 | ++ | +++ | +++ | +++ |

In the table, the numerals in the upper and lower parentheses show the content in percentage of pectin and pulp materials respectively.

As shown in Table 2, the fruit juice concentrated to 1/2.5 by weight by the method of this invention was found to maintain its stability until as much as 40 parts by weight of fermented milk are added to 100 parts by weight of the juice calculated on the basis of the original fruit juice. On the contrary, the fruit juice concentrated to 1/5 by weight became unstable even when only a slight amount of fermented milk was added. Further, even when the pectin materials (paste material) and the pulp materials are added to the fruit juice concentrated to 1/5 by weight so that it may contain the same amount of the pectin materials and the pulp materials as the above-mentioned fruit juice concentrated to 1/2.5 by weight, the mixture became more coagulated than the sample containing the fruit juice concentrated to 1/2.5 by weight. This is because the low concentration in case of the fruit juice concentrated to 1/2.5 by weight prevents the pectin materials from deteriorating, but the stability of the colloidal particles of the added pectin materials has already been reduced, because of its deterioration by the acid hydrolysis upon extracting the pectin materials even though the mixture contains the same amount of the pectin materials.

The invention is further illustrated in the following Examples.

EXAMPLE 1

Pelled Unshu oranges were crushed by a chopper, fed to a pulper having the screen of 1.5 mm meshes and squeezed so that the pulp materials content of the juice might be 15 percent by volume. The fruit juice was de-aerated under a reduced pressure of 17 mmHg and at 20°C. The juice was then subjected to the heat treatment of 93°C for 15 seconds. After cooling, it was subjected to the high pressure homogenizing treatment at 150 kg/cm². The resulting fruit juice was concentrated at 20°C and 20 mmHg to obtain the Unshiu orange juice concentrated to 1/2.5 by weight.

Skim milk was sterilized by heating it at 90°C for 15 seconds. After cooling down to 37°C, a 3 percent L. bulgaricus starter was added thereto. The milk was then subjected to the lactic acid fermentation at 37°C for 16 hours. After the acidity as lactic acid was brought to 1.8 w/v percent, the milk was homogenized at 150 kg/cm².

To four parts of the above Unshiu orange juice concentrated to 1/2.5 by weight, one part of this fermented milk, four parts of sucrose, and one part of purified water, as well as a small amount of organic acids, food flavorings, and food colorings, were added. The resulting mixture was sterilized at 93°C for 15 seconds to produce the fruit juice drink containing fermented milk.

EXAMPLE 2

Fruit juice squeezed from summer oranges by an in-line extractor was adjusted to contain 20 percent by volume of the pulp materials. It was then deaerated and heat-treated under the same conditions as in Example 1. The juice was then vacuum-concentrated to one third by weight at 25°C and 20 mmHg to obtain the summer orange juice concentrated to one third of the original weight. On the other hand, lactic acid was stirred into sterilized skim milk so that the acidity as lactic acid in the skim milk became about 1.8 w/v percent. The milk was then subjected to a homogenizing treatment at 150 kg/cm² to obtain organic acids-added milk.

Then five parts by weight of the above summer orange juice concentrated to one-third weight, 10 parts by weight of the Unshiu orange juice concentrated to 1/2.5 by weight in such a manner as in Example 1, five parts by weight of the above organic acids-added milk, eight parts by weight of sucrose were added, as well as organic acids, food colorings, food flavorings and so forth, and purified water to amount to 100 parts by weight in total. The mixture thus obtained was subjected to high pressure homogenizing treatment at 150 kg/cm² to produce the fruit juice drink containing sour milk.

We claim:
1. A method of producing fruit drinks comprising:
   a. concentrating 100 parts by weight of citrus fruit juices containing from 10 to 25 percent by volume of the pulp materials composed mainly of vesicle membrane to not less than one-third of their original weight, and
   b. mixing said fruit juice concentrate with from 5 to 40 parts by weight calculated on the basis of original fruit juice weight of fermented milk.
2. The method of claim 1, wherein said fermented milk is made from skim milk.
3. The method of claim 1, wherein said fermented milk is made from reconstituted skim milk.
4. The method of claim 1, wherein the mixture of the said concentrated fruit juices and the said milk is homogenized after mixing.
5. A method of producing fruit drinks comprising:
   a. concentrating 100 parts by weight of citrus fruit juices containing from 10 to 25 percent by volume of the pulp materials composed mainly of vesicle membrane to not less than one-third of their original weight, and
   b. mixing said fruit juice concentrate with from 5 to 40 parts by weight calculated on the basis of original fruit juice weight of milk with added organic acids.
6. The method of claim 5, wherein the milk with added organic acids is made from skim milk.

7. The method of claim 5, wherein the milk with added organic acids is made from reconstituted skim milk.

8. The method of claim 5, wherein said organic acids are lactic acid, citric acid, malic acid and fumaric acid.

9. The method of claim 5, wherein the mixture of the said concentrated fruit juices and the said milk with added organic acids is homogenized after mixing.

10. Fruit drinks containing in admixture:
   a. fruit juice concentrate obtained by reducing 100 parts by weight of critic fruit juices containing from 10 to 25 percent by volume of the pulp materials composed mainly of vesicle membrane to not less than one-third of their original weight, and
   b. from 5 to 40 parts by weight calculated on the basis of original fruit juice weight of fermented milk.

11. Fruit drinks containing in admixture:
   a. fruit juice concentrate obtained by reducing 100 parts by weight of citrus fruit juices containing from 10 to 25 percent by volume of the pulp materials composed mainly of vesicle membrane to not less than one-third of their original weight, and
   b. from 5 to 40 parts by weight calculated on the basis of original fruit juice weight of milk with added organic acids.

* * * * *